United States Patent [19]

Frisch et al.

[11] 3,836,430
[45] Sept. 17, 1974

[54] CABLE SUPPORT STRUCTURE FOR ENABLING A NUCLEAR REACTOR TO BE REFUELED RAPIDLY

[75] Inventors: Erling Frisch, Pittsburgh; Harry N. Andrews, Export, both of Pa.

[73] Assignee: Westinghouse Electric Corporation, Pittsburgh, Pa.

[22] Filed: July 8, 1970

[21] Appl. No.: 53,203

[52] U.S. Cl.................... 176/33, 176/27, 176/30, 248/51, 248/61
[51] Int. Cl........................................... G21c 19/20
[58] Field of Search ................... 176/29, 33, 27, 35; 248/51, 52, 61

[56] References Cited
UNITED STATES PATENTS

| | | | |
|---|---|---|---|
| 1,432,964 | 10/1922 | Busker et al. | 248/51 |
| 2,205,665 | 6/1940 | Peters | 248/51 |
| 2,619,888 | 12/1952 | Young et al. | 248/51 |
| 3,243,353 | 3/1966 | Costes et al. | 176/33 |
| 3,354,040 | 11/1967 | Frame et al. | 176/29 |
| 3,438,856 | 4/1969 | Ripley | 176/35 |

*Primary Examiner*—Reuben Epstein
*Attorney, Agent, or Firm*—J. R. Campbell

[57] ABSTRACT

The cables containing the electrical wiring for the control rod mechanisms and the instrumentation for a nuclear reactor are brought by the shortest path to cable support racks affixed to the enclosure surrounding the control mechanisms hereinafter referred to as the mechanism enclosure. The cables are supported on a series of such support racks until they terminate in receptacles mounted on the floor of a platform attached to the mechanism enclosure on the side facing the refueling storage area for the mechanisms, vessel head and internals. An elongated frame-like cable tray is attached to the platform by a hinged joint while the other end is supported on flanged guide rollers. The cables are looped onto the cable tray at its hinged end and are supported in tiers thereon by separator plates and anchor clamps. At the other end of the tray, the cables are hung in large loops and are connected to plugs in the floor of the instrument room. The cables accordingly need not be disconnected from the mechanisms when moving same for refueling.

9 Claims, 6 Drawing Figures

INVENTORS
Erling Frisch &
Harry N. Andrews

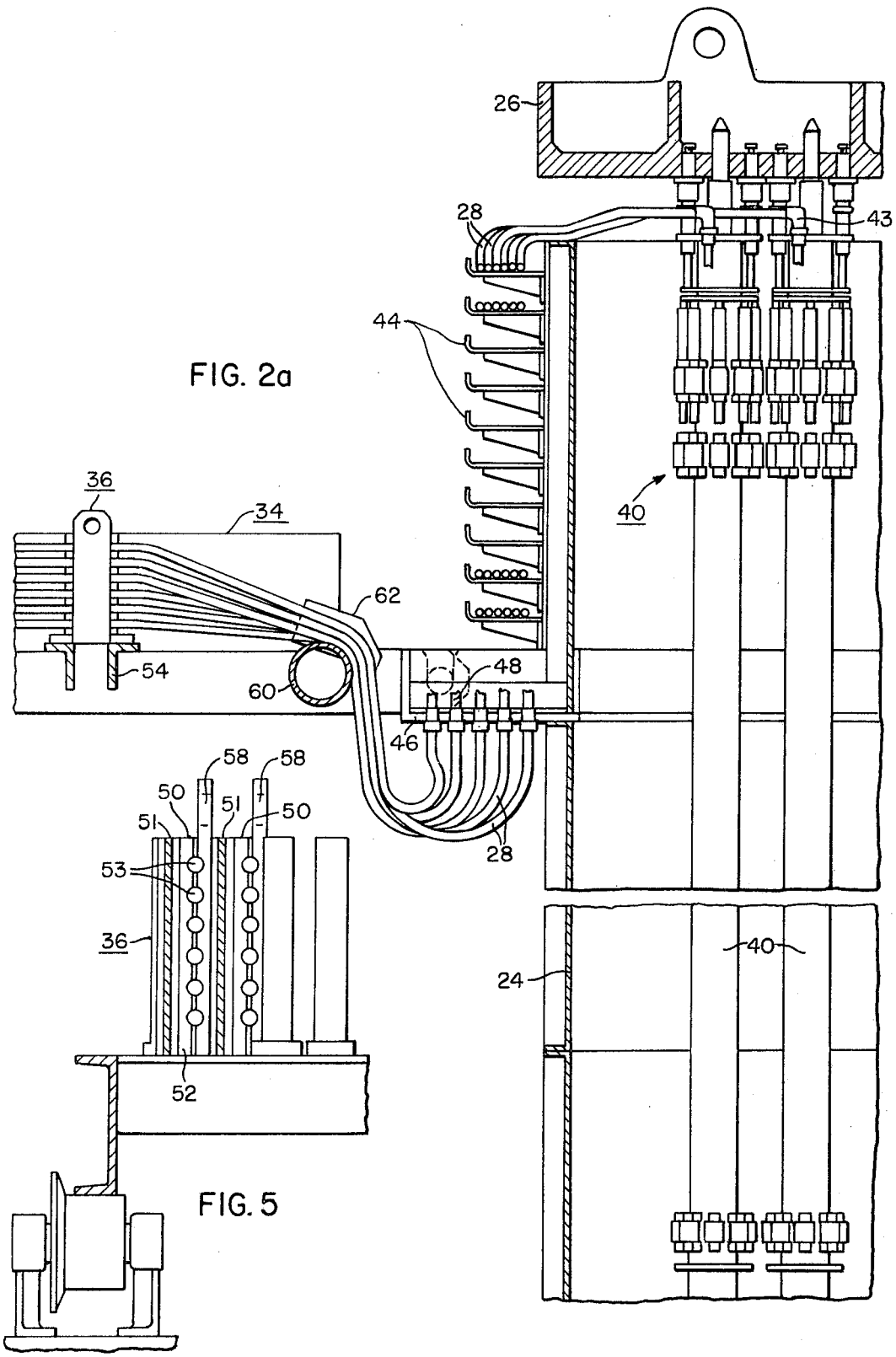

CABLE SUPPORT STRUCTURE FOR ENABLING A NUCLEAR REACTOR TO BE REFUELED RAPIDLY

CROSS REFERENCE TO RELATED APPLICATIONS

This application relates to the following applications concurrently filed herewith and which are assigned to the same assignee as the present invention:

Ser. No. 53,207 entitled "Means for Rapidly Exposing the Core of A Nuclear Reactor For Refueling" by Erling Frisch and Harry N. Andrews.

Ser. No. 53,201 entitled "Rapidly Refuelable Nuclear Reactor" by Erling Frisch and Harry N. Andrews.

Ser. No. 53,200 entitled "Combination of Nuclear Reactor and Missile Shield" by Erling Frisch and Harry N. Andrews.

Ser. No. 53,199 entitled "Means For Retaining and Handling Reactor O-Ring Seals" by Erling Frisch.

Ser. No. 53,198 entitled "Hydraulic Head Closure Mechanism" by Erling Frisch and Harry N. Andrews.

Ser. No. 53,202 entitled "Rapidly Refuelable Nuclear Reactor" by Harry N. Andrews and Richard S. Orr.

BACKGROUND OF THE INVENTION

This invention pertains to the support and arrangement of the cables for the control mechanisms and the instrumentation of a nuclear reactor, and more particularly to a support structure which enables such cables to remain connected while the mechanisms are moved in preparation for refueling.

It has recently been realized that extraordinary savings can be obtained through rapid and frequent refueling of nuclear reactors. One obstacle to rapidly refueling a nuclear reactor is the time consuming task of disconnecting, storing, reconnecting and checking the numerous cables connected to the control mechanisms and instrumentation of present nuclear reactors.

More particularly with respect to a nuclear reactor such as that shown in copending application Ser. No. 53,202 the electrical leads are contained within cables which must extend from the containment penetration wall, generally through an instrument and control room, to the nuclear reactor situated at the center of the containment. The storage area for the vessel head, upper internals and mechanism is generally some distance in the direction of the instrument room. If the cables were simply allowed to hang where they would when storing the mechanism, etc. some portion would probably lie in the refueling water and other portions might form into tight loops which could subsequently cause failure of the wires. For these reasons, the cables are now disconnected and carefully stored before removing the vessel head and mechanism preparatory to refueling.

SUMMARY OF THE INVENTION

The savings associated with rapid refueling can be achieved, inter alia, by retaining the electrical cables in their connected configuration during refueling. An elongated frame-like cable support tray is provided for mounting the electrical cables throughout a substantial portion of their length. The support tray is pivotally affixed to the mechanism enclosure and slidably supported some distance from its point of connection to the mechanism housing.

The mechanism enclosure prescribes an arcuate path when moved from its position of mounting on the reactor pressure vessel to its storage area. The cable tray, through a combination of sliding and rotating movement, retains the cables in a substantial straight configuration for a substantial portion of their length proximate the mechanism enclosure and allows them to hang in a large radius loop for most of the remainder of their length. The substantially straight configuration adjacent the mechanism enclosure assures that the cables will not hang into the refueling water, and the large radius loop aids in prohibiting wire failures due to kinking.

DESCRIPTION OF THE DRAWINGS

For a better understanding of the invention, reference may be had to the accompanying exemplary drawings, in which:

FIGS. 2A and 2B, taken end to end, are a sectional view of a portion of a nuclear reactor;

FIG. 5 is a sectional view of a portion of the cable tray.

DESCRIPTION OF THE PREFERRED EMBODIMENT

Figure 1:
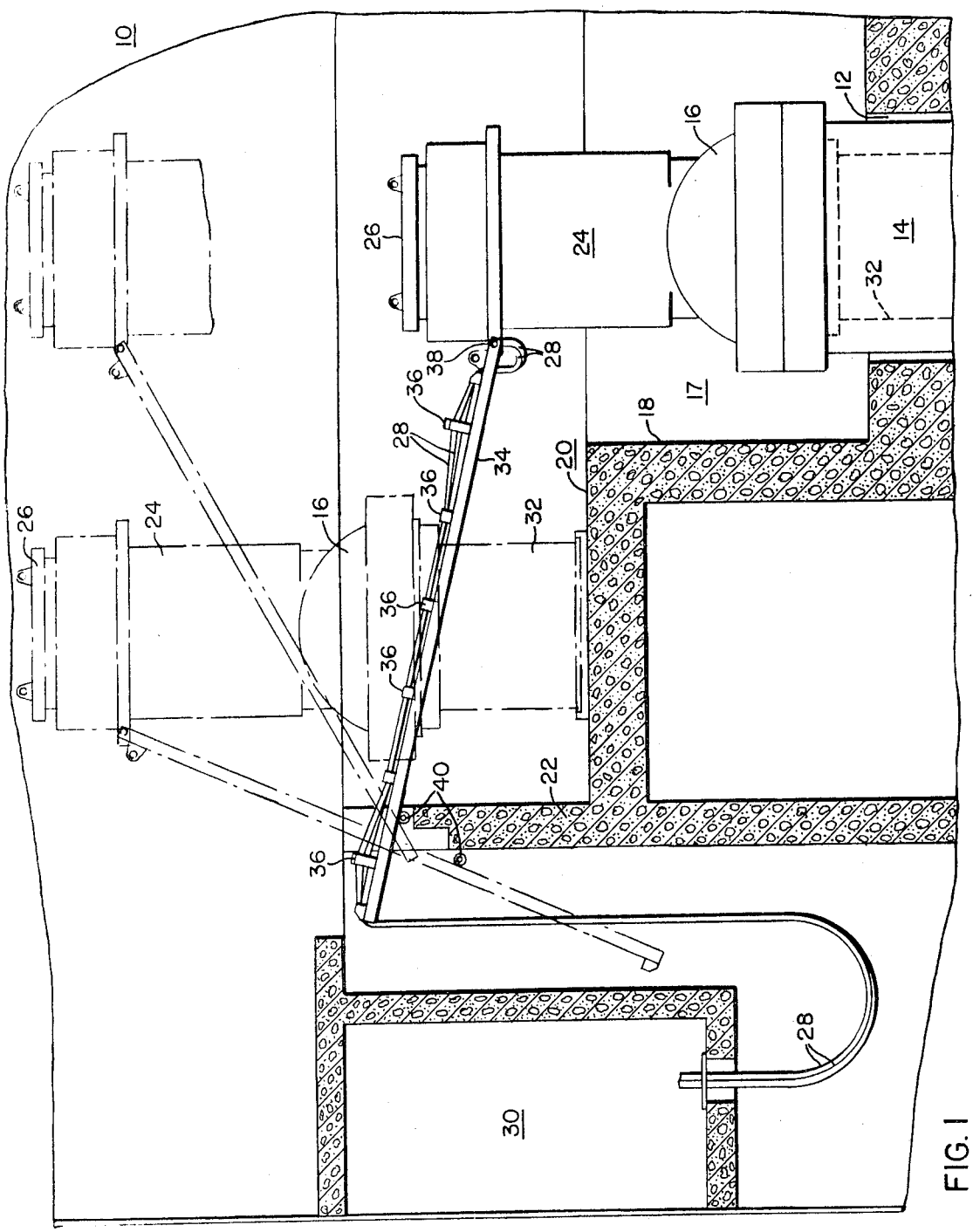
FIG. 1 shows a portion of a reactor containment structure arrangement.

Referring to FIG. 1, there is shown a portion of a containment structure 10 for a nuclear steam generating system. The containment structure 10 includes a concrete well 12 in which a pressure vessel 14 is supported. Surrounding the closure head 16 of the pressure vessel 14 is a slightly larger well 17 formed by an annular wall 18. Next to the well is a storage space provided by a floor 20. A wall 22, spaced outwardly from wall 18, also surrounds the vessel 14 and serves as an upper containment wall for a refueling pool which extends some distance above the well 17.

The vessel head 16 is surmounted by a plurality of control mechanisms which move control rods capable of varying the neutron flux within the core of the reactor. The enclosure 24 and missile shield 26 for these mechanisms are shown in FIG. 1.

The mechanisms exemplified require electric power for their operation. The power is conveyed to the mechanism through a plurality of electrical cables 28 which may conveniently enter the inner containment space through the floor of an instrument room 30.

As shown in phantom in FIG. 1, the mechanism enclosure 24, vessel head 16 and certain portions of the reactor internals, designated by the numeral 32, traverse an arcuate path in moving to their storage location on floor 20. As indicated, it was previously required that the cables 28 be disconnected before the above-indicated structure was moved to prevent damage to same.

In accordance with this invention, a cable tray 34 is provided which fixedly positions the cables 28 at a plurality of positions along their length by means of a like plurality of upwardly extending support members 36. The cable tray 34 is pivotably supported at its one end on the mechanism housing 24 by means of hinge arrangement 38. Guide rollers 40 support the free end of the cable tray 34.

Figure 2B:
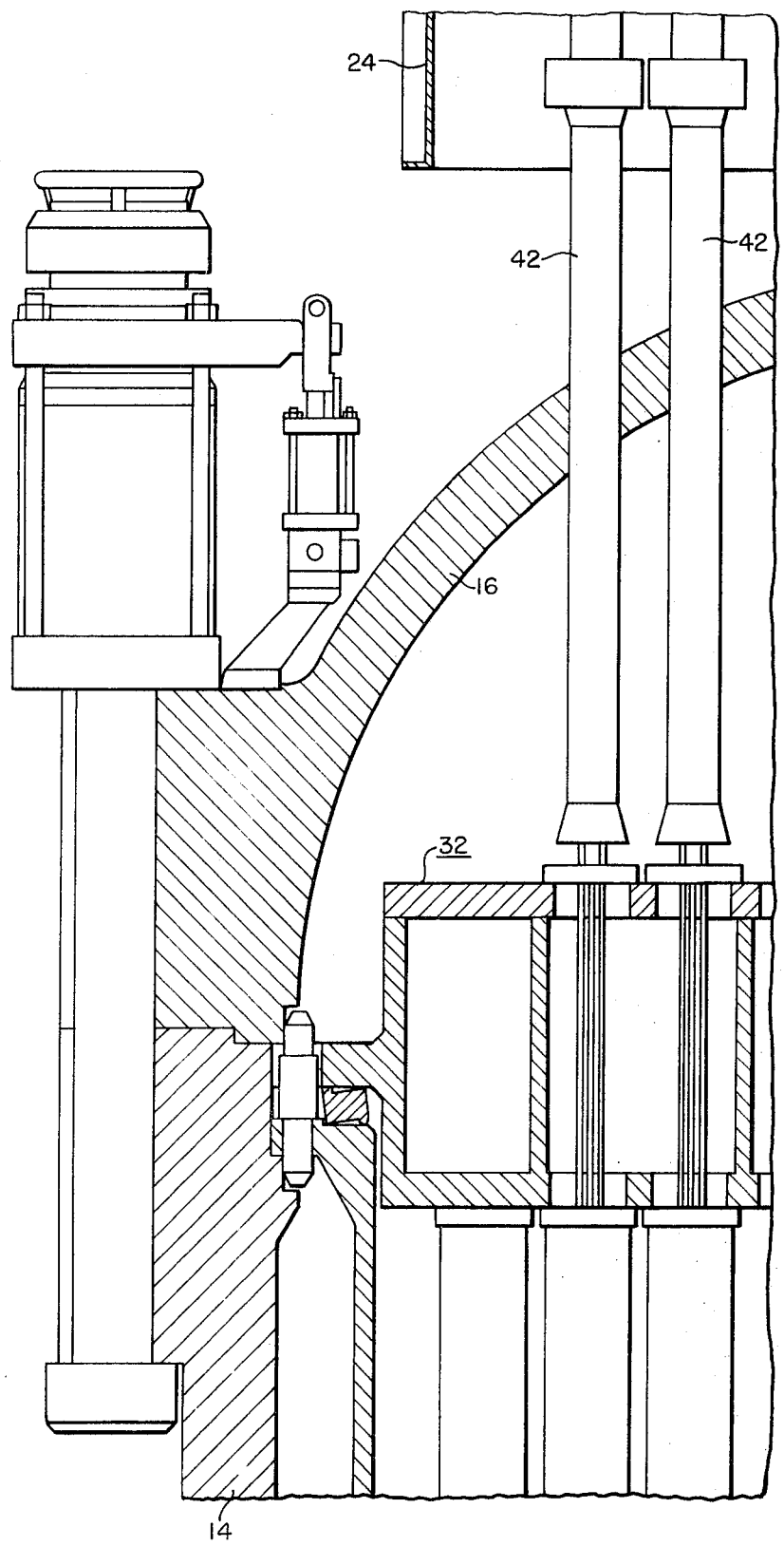
Figure 3:
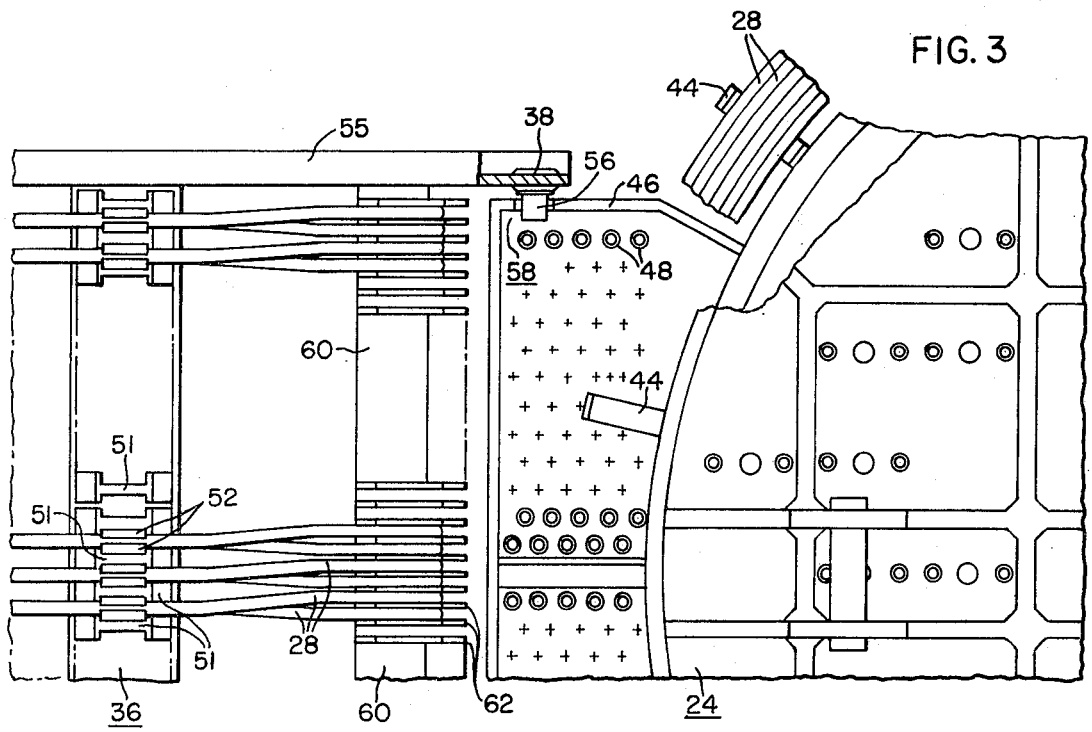
FIG. 3 is a plan view of the control mechanism enclosure and electrical cable support structure.

As the vessel head 16, and associated structure, are moved from their position above the nuclear reactor to their storage position, the cable tray 34 prohibits the cables 28 from hanging into the refueling water or from forming into tight loops. More particularly, it can be seen in FIGS. 2A, 2B and FIG. 3, that a plurality of control mechanisms 40 are mounted on penetration adapters 42. The design of the mechanism 40 is described at length in a copending application Ser. No. 700,121 of Erling Frisch et al. filed on Jan. 24, 1968. The mechanisms 40 are located within the enclosure 24 and are surmounted by a missile shield 26, as previously indicated.

Figure 4:
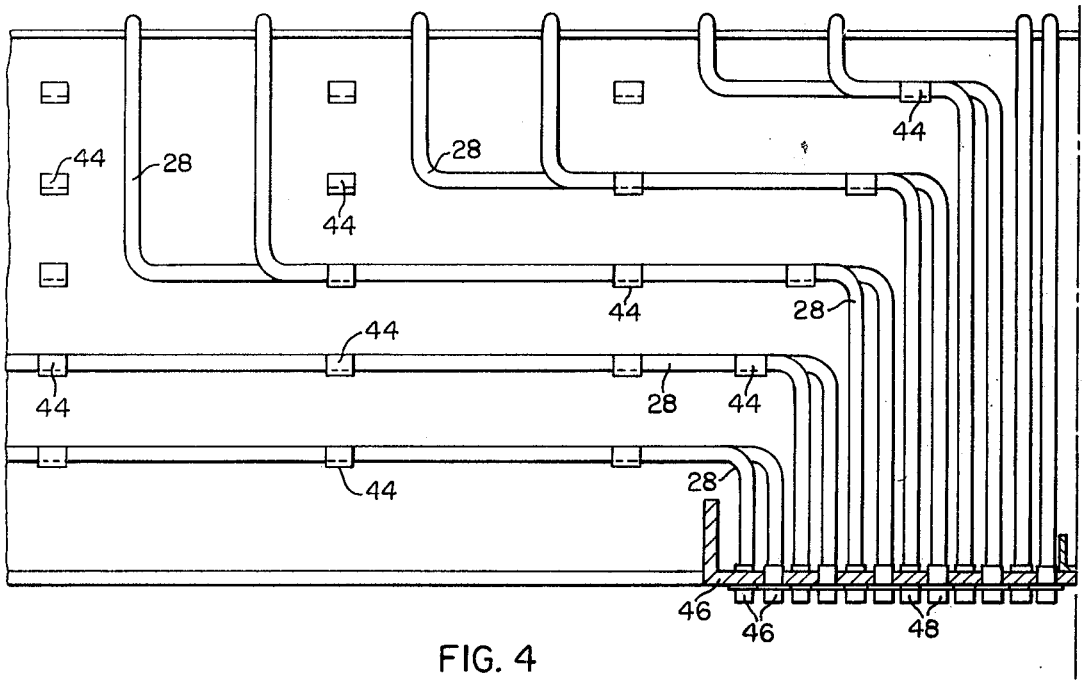
FIG. 4 shows a development view of a portion of the control mechanism enclosure.

The electrical cables 28 from the individual mechanisms 40 are connected to angle plugs 43. The cables 28 are then brought by the shortest path to one of a plurality of support brackets 44 mounted perpendicular to the housing 24. FIG. 4 shows a layout view of a portion of the housing 24. As can be seen, the cables are dropped over the top of the enclosure 24 and are extended vertically downward until they are brought to rest on a bracket 44. The cables then extend horizontally over a plurality of brackets 44 in a chosen row.

A cable support platform 46 is provided below the brackets 44 and on the side adjacent the cable tray 34. The cables 28 are conveyed into multi-conductor receptacles 48 on platform 46 from which they loop onto the cable tray 34 (see FIG. 2A).

The cable tray 34, as indicated, is provided with a plurality of support members 36 which comprise anchor clamps 50 and brackets 51 which provide support for the anchor clamps 50 (see FIG. 5). The clamps 50 are preferably constructed from a plurality of fabric sheets 52 of molded fibrous material sold under the trademark Micarta, each of which have a plurality of grooves 53 therein. When two sheets 52 are placed together with their grooves 53 on adjacent faces an opening is formed through which a cable 28 may be led. The sheets may be held together with bolts (not shown) so as to fixedly support a plurality of cables in a tiered relationship. Brackets 51 are preferably bolted to angle iron cross-bars 54 which join steel channels 55 which form the sides of the tray 34. The brackets 51 are so shaped as to form channels into which the sandwich constructed from two sheets 52, i.e., the anchor clamp 50, may slide. Each clamp 50 thus formed and supported has an extending side with a lifting eye 58. Thus each tiered grouping of cables can be assembled remotely or easily removed for repairs.

At each end of the cable tray 34 and at intermediate support locations 36 a tubular cross bar 60 joins the steel channels 55 and is provided with separator plates 62. As exemplified three cables 28 are stacked between each set of separator plates 62 (see FIG. 3). Six cables are then supported by each anchor clamp 50. The bars 60 also serve to limit the bending radius of the cables 28; which requirement was previously discussed.

It should therefore be clear that since the cables 28 are securely attached to the cable tray 34, and the tray 34 is in turn affixed to the platform 46, that little force acts toward pulling the cables 28 away from the mechanisms 40 to which they are attached. This, of course, continues to be true during movement of the mechanisms 40 to their storage location on floor 20. Further, the above-disclosed structural arrangement prohibits the cable 28 from hanging into the refueling water or forming into small loops. This structural arrangement is equally applicable to hydraulic lines which are sometimes used in connection with control mechanisms.

Moreover, should it become necessary to disconnect the cable tray 34 from the housing 24, this is easily accomplished by raising the end of the tray 34 from the platform 46. For this purpose, the hinged arrangement 38 is constructed from lugs 56 which fit into grooves 58 in the sides of the platform 46. The tray may then be brought to a nearly vertical position and supported for repairs.

In view of the above it will be apparent that many modifications and variations are possible in light of the above teachings. It therefore is to be understood that within the scope of the appended claims, the invention may be practiced other than as specifically described.

What we claim is:

1. A structure for supporting and moving a plurality of elongated flexible energy conveying means, which means are connected at one end to a source of energy and at the other end to an element which is periodically moved between remote positions, which comprises:
   an elongated relatively rigid structure affixed to said energy conveying means at a plurality of points along a portion of their length, said structure being pivotably affixed to said element at one end, and means slidably supporting said structure intermediate its ends.

2. The support structure of claim 1 wherein the source of energy is fixedly positioned and said element prescribed an arcuate path between an operative position and a storage location.

3. A nuclear reactor including cable support structure for enabling rapid refueling of a nuclear reactor comprising:
   a pressure vessel for a nuclear reactor having an upper open end closed by a removable closure head;
   upstanding means mounted adjacent said closure head and removable with said head as a unit from said pressure vessel;
   control mechanisms surmounting said head for controlling operation of the reactor;
   electric cables adapted for connection to a power source at one end and terminating at their other ends in said control mechanisms on said closure head;
   relatively rigid cable support means positioned intermediate the power source connection and the control mechanisms for supporting and holding said cables in a preset position; and
   said cable support means further being movably connected at one end to the upstanding means and arranged adjacent its other end for sliding movement on a stationary base adjacent the reactor;
   whereby as the head and upstanding means are removed from the reactor for reactor refueling purposes, the cables and cable support means move therewith thus permitting the head, upstanding means, cables and cable support means to be moved as a unit during the refueling operation.

4. The combination according to claim 3 wherein means pivotally connects the support means to the upstanding means so as to permit relative movement therebetween during the time of removal of the head and upstanding means from the reactor.

5. The combination according to claim 3 including cable clamps on said cable support means for holding a plurality of cables in a tiered relationship and said support means further including brackets having slots therein for slidably receiving and supporting said cable clamps.

6. The combination according to claim 3 wherein said upstanding means comprises an enclosure which surrounds the control mechanisms in the reactor, a platform mounted on said enclosure and having means for receiving and supporting said cables thereon, and wherein said cable support means is pivotally connected to said enclosure.

7. The combination according to claim 6 wherein holding means is affixed to said enclosure for receiving said cables and guiding them to the vicinity of said platform.

8. The combination according to claim 3 wherein the support means comprises a cable tray, and means on said tray for holding the cables firmly in position and against lateral displacement.

9. A cable support structure for enabling rapid refueling of a nuclear reactor comprising a multiplicity of electric cables adapted for connection at one end to a power source and at its other end to an enclosure enclosing control mechanisms on said reactor for furnishing electric power thereto, a cable support tray pivotally connected at one end to said enclosure and having means on its other end for sliding engagement with a base used for supporting the other end of the tray so that when the enclosure is removed from the reactor for the purpose of refueling the reactor, the tray and its supported cables move with the enclosure thus eliminating the need to separate and detach each cable from its point of connection to the enclosure, and means on said tray for firmly anchoring the cables thereon in a preestablished pattern and to prevent their lateral displacement on the tray surface.

* * * * *